US 7,842,204 B2

(12) United States Patent
Chiu

(10) Patent No.: US 7,842,204 B2
(45) Date of Patent: Nov. 30, 2010

(54) METHOD FOR PRODUCING LAMINATED PHOTOCHROMIC LENSES

(75) Inventor: Hao Wen Chiu, Palm Harbor, FL (US)

(73) Assignee: Essilor International (Compagnie Generale d'Optique) (FR)

( * ) Notice: Subject to any disclaimer, the term of this patent is extended or adjusted under 35 U.S.C. 154(b) by 310 days.

(21) Appl. No.: 11/448,485

(22) Filed: Jun. 7, 2006

(65) Prior Publication Data
US 2007/0001327 A1   Jan. 4, 2007

Related U.S. Application Data

(63) Continuation-in-part of application No. 11/147,614, filed on Jun. 8, 2005.

(51) Int. Cl.
*B29D 11/00* (2006.01)
(52) U.S. Cl. ........................ 264/2.2; 264/1.32
(58) Field of Classification Search ........... 264/1.32, 264/1.7, 1.8, 2.2; 425/808; 156/230
See application file for complete search history.

(56) References Cited

U.S. PATENT DOCUMENTS

| | | |
|---|---|---|
| 1,948,636 A | 2/1934 | Tillyer |
| 2,263,249 A | 11/1941 | Rogers |
| 2,320,375 A | 6/1943 | Moulton |
| 2,618,200 A | 11/1952 | Clave et al. |
| 3,031,926 A | 5/1962 | Hancock |
| 3,877,798 A | 4/1975 | Tolar et al. |
| 4,268,134 A | 5/1981 | Gulati et al. |
| 4,287,018 A | 9/1981 | Gulati et al. |
| 4,495,015 A | 1/1985 | Petcen |
| 4,547,049 A | 10/1985 | Cotie |
| 4,576,623 A | 3/1986 | Mann |
| 4,577,942 A | 3/1986 | Frieder et al. |
| 4,645,317 A | 2/1987 | Frieder et al. |
| 4,679,918 A | 7/1987 | Ace |
| 4,781,452 A | 11/1988 | Ace |
| 4,793,703 A | 12/1988 | Fretz, Jr. |
| 4,846,913 A | 7/1989 | Frieder et al. |
| 4,859,261 A | 8/1989 | Ace |
| 4,867,553 A | 9/1989 | Frieder |
| 4,883,548 A | 11/1989 | Onoki |
| 4,923,758 A | 5/1990 | Marks et al. |
| 5,064,712 A | 11/1991 | Fretz, Jr. |
| 5,135,298 A | 8/1992 | Feltman |
| 5,139,857 A | 8/1992 | Herndon et al. |
| 5,147,585 A | 9/1992 | Blum |
| 5,149,181 A | 9/1992 | Bedford |
| 5,178,800 A | 1/1993 | Blum |
| 5,187,505 A | 2/1993 | Spector |

(Continued)

FOREIGN PATENT DOCUMENTS

GB     1577522     10/1980

(Continued)

*Primary Examiner*—Christina Johnson
*Assistant Examiner*—Larry Thrower
(74) *Attorney, Agent, or Firm*—Keusey & Associates, P.C.

(57) ABSTRACT

A method for laminating an optical assembly and the optical assembly formed thereby. An ultra thin lens is injection molded and may include a bifocal feature. A support lens, e.g. of the single vision type, is provided with a photochromic coating. A flexible two stage compound application process prepares the two lenses for lamination.

17 Claims, 4 Drawing Sheets

U.S. PATENT DOCUMENTS

| | | | |
|---|---|---|---|
| 5,212,280 A | 5/1993 | Serini et al. |
| 5,223,862 A | 6/1993 | Dasher et al. |
| 5,312,689 A | 5/1994 | Dasher et al. |
| 5,323,191 A | 6/1994 | Firtion et al. |
| 5,351,100 A | 9/1994 | Schwenzfeier et al. |
| 5,415,817 A | 5/1995 | Shiao et al. |
| 5,526,068 A | 6/1996 | Markovitz |
| 5,757,459 A | 5/1998 | Bhalakia et al. |
| 5,790,227 A | 8/1998 | Rorabaugh |
| 5,827,614 A | 10/1998 | Bhalakia et al. |
| 5,851,328 A | 12/1998 | Kohan |
| 5,856,860 A | 1/1999 | Bhalakia et al. |
| 5,858,163 A | 1/1999 | Wood et al. |
| 5,883,169 A | 3/1999 | Spector et al. |
| 5,914,193 A * | 6/1999 | Ono et al. ............ 428/451 |
| 5,916,398 A | 6/1999 | Coleman et al. |
| 5,926,248 A | 7/1999 | Tucker |
| 5,959,761 A | 9/1999 | Perrott et al. |
| 5,972,252 A | 10/1999 | Saito et al. |
| 6,033,518 A | 3/2000 | Backfisch |
| 6,051,091 A | 4/2000 | Wood et al. |
| 6,065,836 A | 5/2000 | Krishnan et al. |
| 6,074,579 A | 6/2000 | Greshes |
| 6,102,539 A | 8/2000 | Tucker |
| 6,106,665 A | 8/2000 | Wood et al. |
| 6,109,748 A | 8/2000 | Spector et al. |
| 6,177,032 B1 | 1/2001 | Smith et al. |
| 6,180,033 B1 | 1/2001 | Greshes |
| 6,220,703 B1 | 4/2001 | Evans et al. |
| 6,231,183 B1 | 5/2001 | Dillon |
| 6,242,065 B1 | 6/2001 | Blomberg et al. |
| 6,256,152 B1 | 7/2001 | Coldrey et al. |
| 6,270,698 B1 | 8/2001 | Pope |
| 6,284,162 B1 | 9/2001 | Kingsbury et al. |
| 6,319,433 B1 | 11/2001 | Kohan |
| 6,328,446 B1 | 12/2001 | Bhalakia et al. |
| 6,355,124 B1 | 3/2002 | Blomberg et al. |
| 6,361,166 B1 | 3/2002 | Perrott et al. |
| 6,367,930 B1 | 4/2002 | Santelices et al. |
| 6,432,327 B2 | 8/2002 | Beeloo et al. |
| 6,585,373 B2 | 7/2003 | Evans et al. |
| 6,612,697 B1 | 9/2003 | Aurelius et al. |
| 6,616,868 B1 | 9/2003 | Gotoh et al. |
| 6,719,928 B2 | 4/2004 | Dillon |
| 6,793,339 B1 | 9/2004 | Yip et al. |
| 6,797,104 B1 | 9/2004 | Dyer |
| 6,814,896 B2 | 11/2004 | Bhalakia et al. |
| 6,884,369 B2 | 4/2005 | Chiu et al. |
| 6,902,271 B2 | 6/2005 | Perrott et al. |
| 2007/0034321 A1* | 2/2007 | Glacet et al. ............ 156/230 |
| 2007/0076167 A1* | 4/2007 | Kumar et al. ............ 351/159 |
| 2007/0172649 A1* | 7/2007 | Aihara et al. ............ 428/343 |

FOREIGN PATENT DOCUMENTS

| | | |
|---|---|---|
| WO | WO00/71331 A1 | 11/2000 |
| WO | WO03/004255 A2 | 1/2003 |
| WO | WO2004/020183 A | 3/2004 |

* cited by examiner

METHOD FOR PRODUCING LAMINATED PHOTOCHROMIC LENSES

CROSS REFERENCE TO RELATED APPLICATIONS

This application is a continuation-in-part of co-pending application bearing U.S. Ser. No. 11/147,614, filed on Jun. 8, 2005 entitled Method of Injection Molding Thin Thermoplastic Lenses.

BACKGROUND OF THE INVENTION

1. Field of the Invention

The present invention relates to a method for producing photochromic lenses by laminating an ultra thin lens to a support lens with a photochromic layer therebetween.

2. Description of the Related Art

Lenses and other articles manufactured at optical quality have exacting demands for mold replication, high optical transmission and impact resistance. In the 2002 *Polycarbonates* publication, Brunelle and Kailasam describe how polycarbonate is prepared by the transesterification of a bisphenol-A with a carbonate. U.S. Pat. No. 5,212,280 describes diphenols which are useful in the condensation method of producing polycarbonate in the presence of phosgene.

Injection molding of lenses requires edge gating so that the runner ends up remote from the lens surfaces. The paths from the gate to the edge points of the mold cavity are not symmetrical and therefore make it difficult to control the thermodynamics of the cooling melt flow. As lens cavities become thinner, straight injection molding techniques are unable to fill the mold without premature freeze-off. Accordingly, injection molding machines have been modified to enlarge the cavity during some phase of the injection cycle, in a so-called injection/compression process. Recent improvements in injection molding techniques by the applicant have resulted in ultra thin lenses that can be effectively incorporated into laminated lenses.

Previously, relatively thick lenses were utilized in laminated optics, as can be seen for example in U.S. Pat. No. 6,256,152. The process as described in all of the examples, uses a pair of 2.5 mm center thickness Diallyl glycol carbonate lenses. Dially glycol carbonate is a thermoset polymer sold under the trade name CR-39, that is formed into lenses by casting. CR-39 is more brittle, and therefore less flexible, than polycarbonate. As a result the prior art requires perfectly matching base curves on the mating surfaces of the two lenses. An inner film or foil is cast, molded or blown into a solid form having the same base curve as the interfacial surfaces of the two lenses. Despite the uniform base curves, the prior art requires an additional step of treating the interfacial surfaces with plasma or corona discharge inter alia, in order to modify or improve bondability.

U.S. Pat. No. 4,867,553 also relates to cast CR-39 lenses having a center thickness at least 1.0 mm and an edge thickness of approximately 1.7 mm. The patent describes a two component assembly. The cover lens can include coatings, filters or tints. However, within the specified ratio of 1.5 to 2 times more edge thickness than center thickness, a photochromic dye will appear much darker in the thicker, peripheral portions than it will in the center.

Accordingly, it would be desirable to provide a lens assembly having a uniformly thick photochromic layer, along with a streamlined process to laminate a thin and flexible front lens thereon, without having to supply both of the lenses and the photochromic film in the same base curve.

SUMMARY OF THE INVENTION

It is an object of the present invention to provide a method for incorporating injection molded ultra thin (less than 1 mm thickness) thermoplastic lenses into an optical assembly.

It is a further object of the present invention to provide photochromic functionality to the laminated optical assembly.

It is another object to provide a flexible two stage compound application step for accommodating a variety of lens and coating conditions.

These and other related objects according to the invention are attained by a method for producing laminated photochromic lenses starting with injection molding an ultra thin front lens having a thickness less than 0.8 mm. A liquid photochromic solution is solidified in situ onto a single vision (SV) support lens without pressure to form a photochromic layer directly on a SV support lens surface in the absence of an intermediate adhesive layer. Next, at least two compounds are applied between the photochromic layer and the ultra thin front lens. The compounds may include a protective layer, a primer layer, an acrylic-based layer, a polyurethane latex layer, an adhesive layer, and combinations thereof. The ultra thin front lens is then laminated onto the photochromic layer with compressive pressure, whereby the shape of the ultra thin front lens can be deflected up to 0.5 base curves to completely conform to the shape of the SV support lens surface.

The ultra thin lens is made from polycarbonate having a viscosity of less than 400 Pa for shear rates below 1,000/s. The injection molding step includes coining an ultra thin lens having a thickness between 0.8 mm and 0.3 mm. The ultra thin front lens is a straight top bifocal lens having an add power between +1.00 and +3.00 diopters. For example, the distance portion is between about 0.7 mm and about 0.5 mm thick.

The step of applying at least two compounds includes first coating a polyurethane latex primer onto the photochromic layer of the support lens. The primer layer is spin-coated onto the convex surface at room temperature then dried at a temperature between 50 degrees and 100 degrees C. There is a second applying step of an optical adhesive between the primer and the ultra thin front lens. A UV curable optical adhesive may be used. For example, a UV curable optical acrylate adhesive that is dispensed from a syringe at room temperature. Alternatively, a pressure sensitive adhesive film may be employed.

In another embodiment, there is a first application of a protective coating onto the photochromic layer of the support lens. Then apply an optical adhesive between the protective coating and the ultra thin front lens. A UV curable optical adhesive may be used. For example, a UV curable optical acrylate adhesive that is dispensed from a syringe at room temperature. Alternatively, a pressure sensitive adhesive film may be employed.

The laminating step occurs at room temperature with a pressure between 5 psi and 60 psi. For example, inflating a silicon rubber bladder to apply pressure onto the ultra thin front lens between about 10 psi and about 25 psi.

The ultra thin lens is a bifocal or multi-focal lens. For example, a straight top bi-focal lens having an add power of between +1.00 and +3.00 diopters. The front surface may include a hard coat or an antireflective coating or both.

The SV support lens has a back surface that is adapted to be ground so that the SV support lens prescription can be customized, thereby providing a straight top bi-focal lens with photochromic properties contributed by a uniformly thick, internally laminated photochromically active layer. The invention also includes the laminated optical assembly made according to the methods described herein.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF PREFERRED EMBODIMENTS

Referring now in detail to invention, there is provided a method for producing laminated photochromic lenses. The method presents a specific use for ultra thin lenses, made according to applicants injection molding process and described in U.S. patent application Ser. No. 11/147,614, the entire contents of which is incorporated herein by reference thereto.

In summary, the related invention provides methods for producing thin lenses made from a thermoplastic material. The invention overcomes difficulties typically associated with injection molding lenses less than 1 mm thick, for example lenses of about 70 mm in diameter. Applications for such lenses include their use as carriers in the backside transfer (BST) process or the front side transfer (FST) process. Further applications include the production of powered lenses having center or edge sections up to about 1 mm thick. The present specification addresses methods for incorporating these thin powered lenses into laminated optical assemblies.

As used herein, the term lens means an optical grade article. The term includes plano lenses as well as powered lenses. Thermoplastic means an optically clear thermoplastic of optical grade. Thermoplastics that may be used include, by way of example only, polycarbonates, polycarbonate/copolyester blends, acrylics like PMMA, cyclic olefin copolymers, amorphous polyamides, polyesters, copolyesters, polyurethanes, and the like.

Laminated optical assemblies have certain advantages over one piece lenses. They allow different lens elements to be combined in a way that offers a large variety of lens powers and functions. For example, thin front lenses can provide bi-focal or multi-focal optics. The support lens can provide basic single vision optics. During the assembly operation, functional filters, like photochromic filters can be sandwiched between the two lenses. This offers a distinct advantage since it is difficult to incorporate photochromic dyes into the lens material. Even if photochromic dyes were compounded into the resin, it would provide different degrees of darkening as a function of lens thickness. As will be described in greater detail below, the present invention provides a more streamlined process for the selection and assembly of laminated lenses, due in large part to the material processing that imparts photochromic functionality as well as the properties of the thin front lenses.

Figure 1:
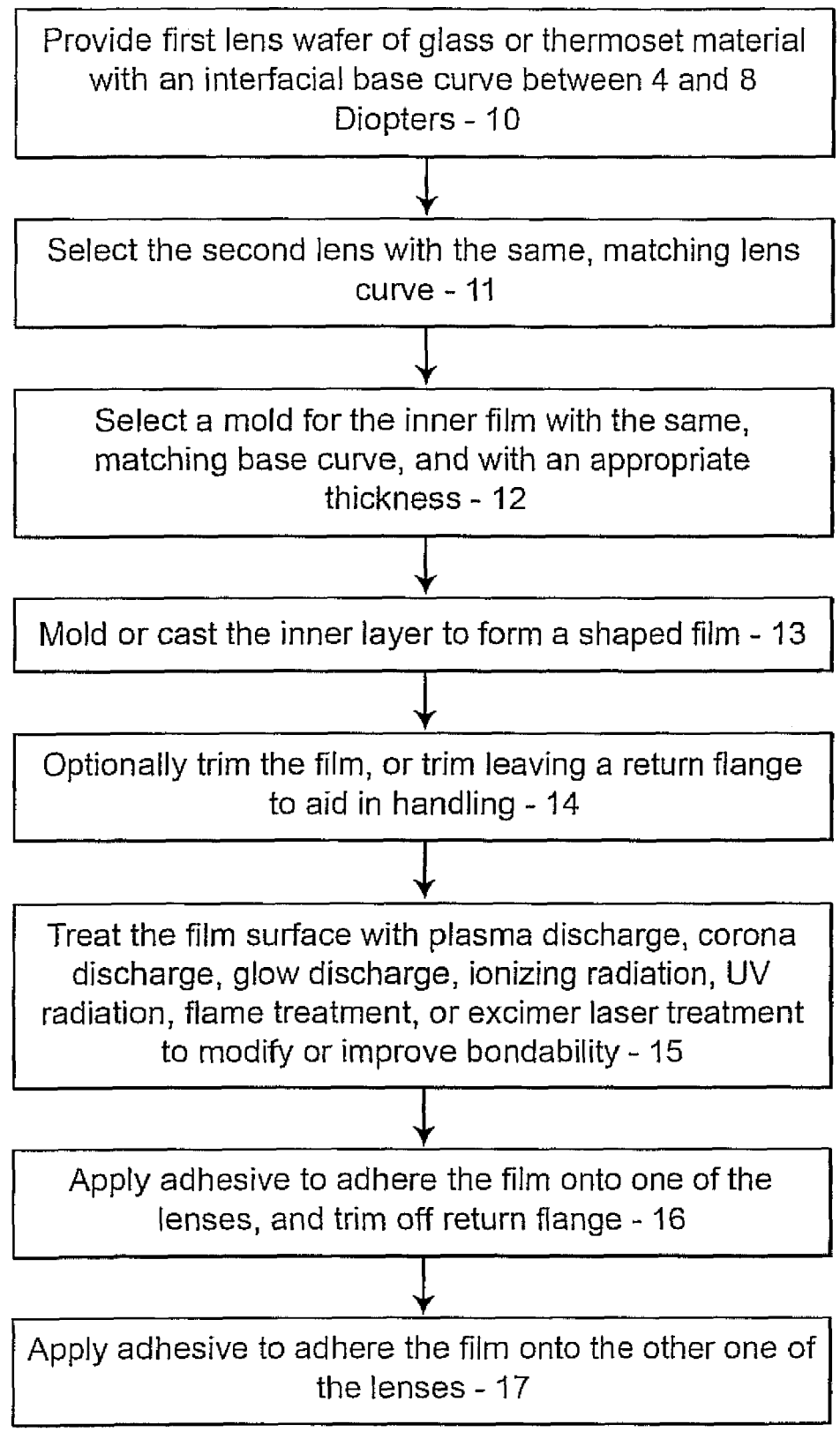
FIG. 1 is a flowchart illustrating a lamination process according to the prior art.

Referring now to FIG. 1, there is shown a series of steps to fabricate laminate lenses according to the prior art. In step 10, the front lens may be made of glass, although cast lenses made from CR-39 seems to be the preferred material. Once this lens is selected, the interfacial base curve is set, and the other components of the assembly must be exactly matching. In step 11 a second cast lens is selected. To impart a photochromic or polarizing film to the assembly, a film mold is needed with the matching base curve and an appropriate film thickness, per step 12. The inner layer is then mold or cast into a shaped film in step 13. The film may be trimmed in various ways in step 14.

When adhering the shaped film to the two lenses, there is an apparent problem with subsequent delamination. As a result the prior art introduces a burdensome step of treating the surfaces to be adhered. Step 15 indicates the surface treatment step as being one of plasma discharge, corona discharge, radiation treatment, laser treatment, etc. In step 16 there is the first application of adhesive to bond the shaped film to one of the lenses. If a flange is present on the film, it may be trimmed in this step, or in a later step. In step 17 there is the second application of adhesive and to bond the second lens to the first lens/film assembly.

Figure 2:
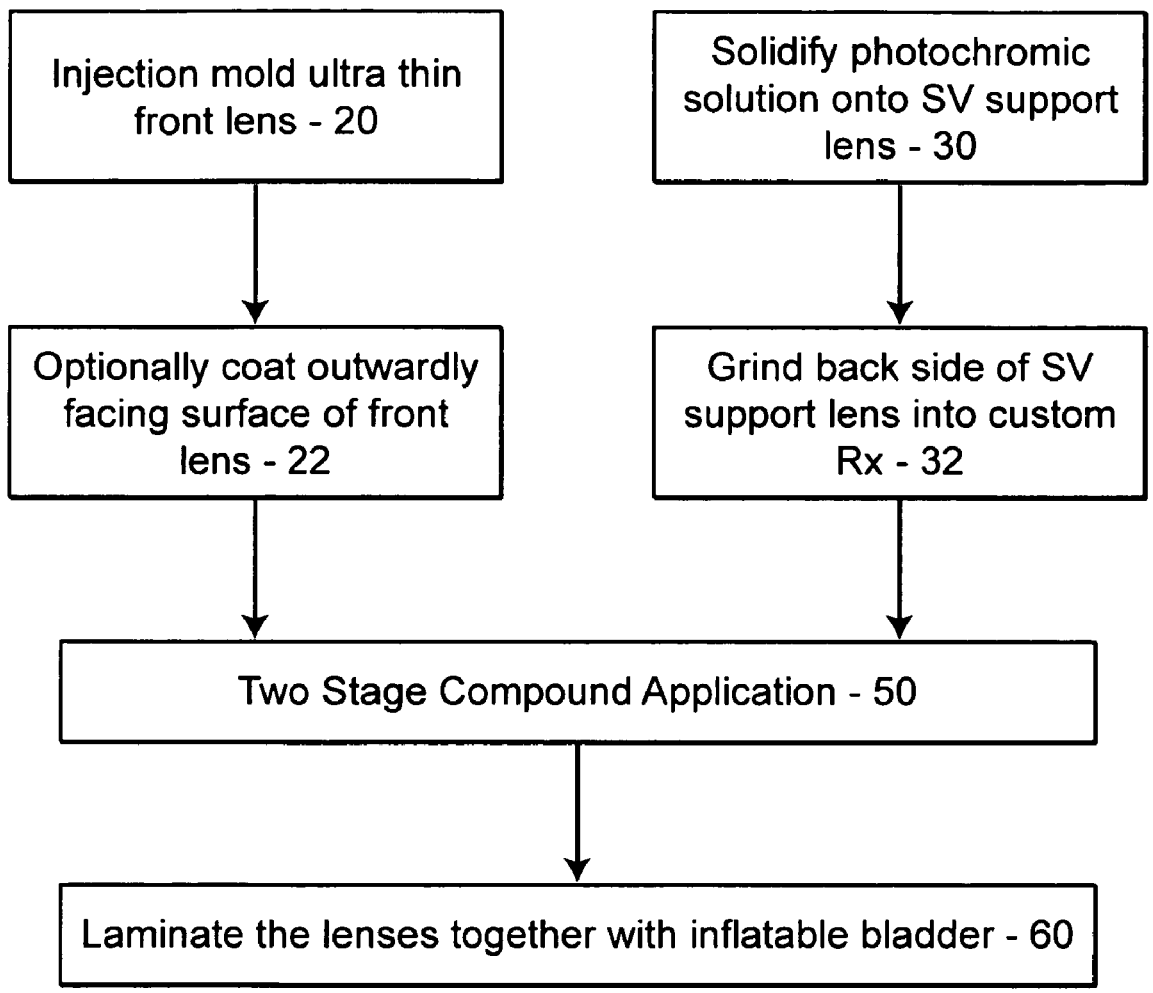
FIG. 2 is a flowchart illustrating a streamlined lamination process according to an embodiment of the invention.
Figure 4:
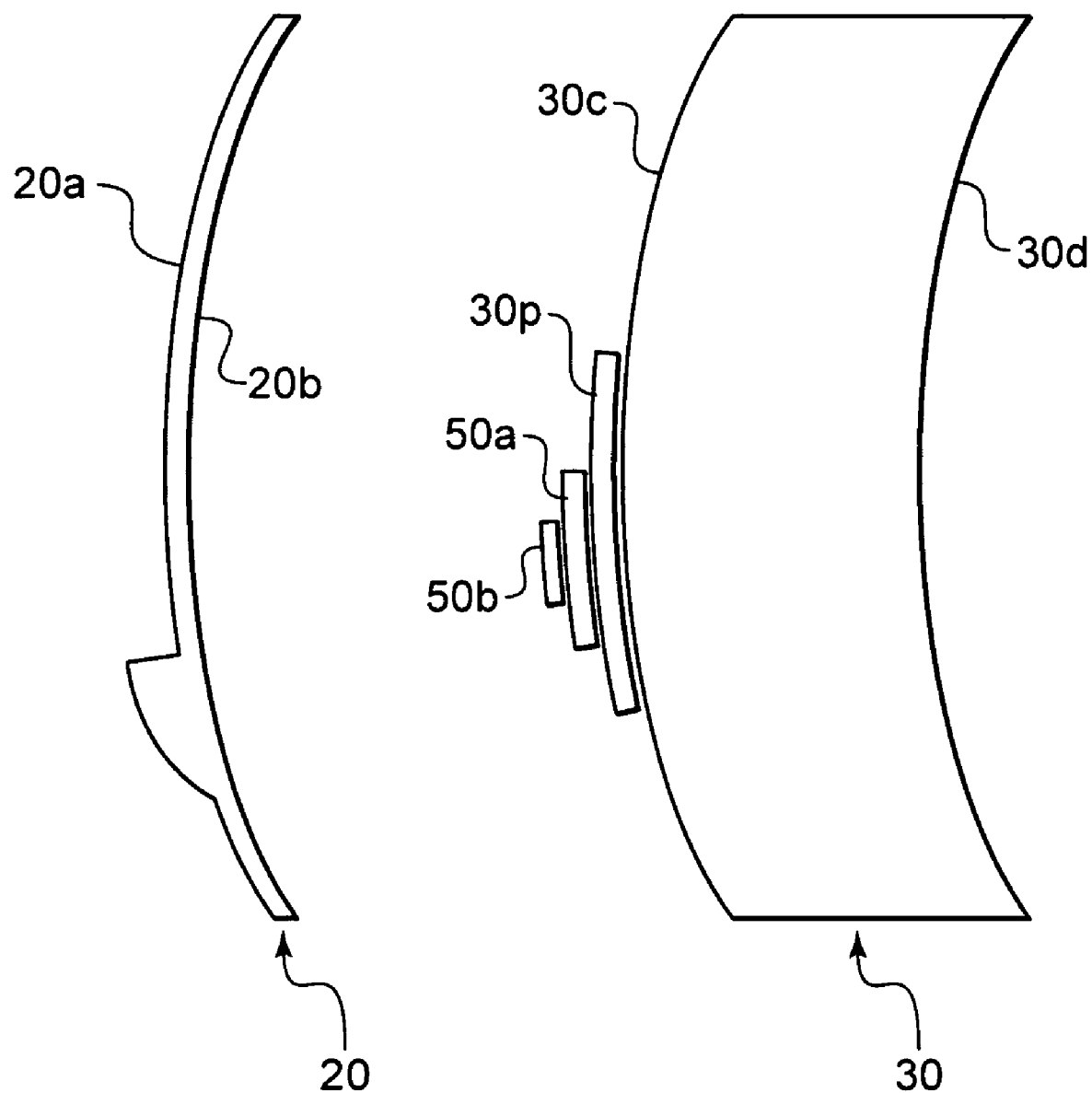
FIG. 4 is a diagram designating the various surfaces and coatings in the laminated assembly.

Referring now to FIG. 2 there is shown several steps pursuant to a streamlined method according to the invention. For consistency and clarity, we refer to FIG. 4 for lens side labels. Reading from left to right, front lens 20 has an outward side 20a, and an opposed inward side 20b. Support lens 30 has an interior side 30c and an exterior side 30d. The ultra thin front lens less than 1.0 mm thick is injection molded in step 20. Step 22 indicates an optional coating on the outward surface 20a of the front lens. The photochromic solution is delivered in liquid form directly on to the interior side 30c of the support lens, which may be a single vision (SV) lens. Once solidified the photochromically enabled surface is referred to as 30p. Step 32 indicates a grinding process on the exterior side 30d of the support lens to impart a custom prescription thereto.

Figure 3:
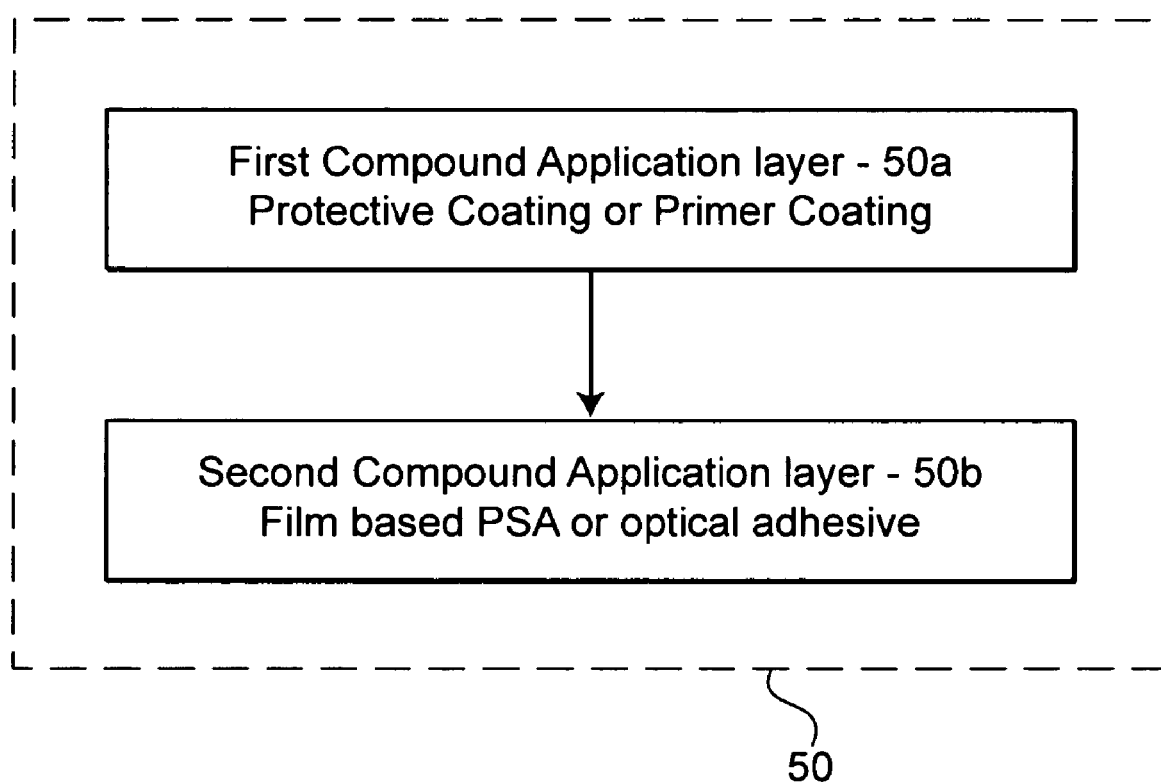
FIG. 3 is a flowchart detailing the available coating options according to the streamlined lamination process according to the invention.

Step 50 includes the application of two compounds, one after the other, as can be seen in FIG. 3. The first compound is applied to surface 30p, and is referred to as 50a. The second compound is applied to either surface 20b or 50a. Generally, the second compound 50b is an adhesive. The lenses are laminated together in step 60 with the three layers sandwiched therebetween to form the completed optical assembly.

Certain aspects of the method will now be described in greater detail.

Summary of Method for Injection Molding Ultra Thin Lenses

The ultra thin lens is one component of the optical assembly described herein. It is the result of recognizing the fact that carriers or lenses with a center thickness about 0.5 mm achieve an excellent balance between flexibility for laminating and rigidity for coating. Severe challenges arise in attempting to injection mold a meniscus-shaped article, at optical quality, via edge-gated injection molding. However, our related application describes injection molding such lenses from optically clear thermoplastics having a viscosity below 400 Pa at a shear rate of 1,000/s measured at 300 degrees C. (Celsius). By adjusting the clamp force it was possible to consistently produce PC lenses through a coining process with a center thickness of about 0.56 mm. High yields were characterized by precision mold replication and uniformity in critical physical lens parameters. Similarly, these factors are intrinsic to the successful production of bifocal and multi-focal lenses.

The related application describes how the mold halves are closed with a predetermined clamp force $F_c$ that is less than the net integrated force exerted on the mold inserts during injection. Molding material is injected into the cavity with a force $F_1$ greater than $F_c$ to force the mold open thereby reducing the flow resistance and allowing the material to reach portions of the insert periphery. A lens having a section less than 1 mm thick is coined as the net integrated force on the inserts subsides.

The flow resistance is reduced by venting the cavity through the open parting line of the mold or reducing the flow resistance, or a combination of both. During the injecting step, the molding material is in intimate contact with the inserts at a thickness greater than the final coined lens thickness. The coining step reduces the thickness of the lens to between 0.5 and 0.6 mm thick as the mold closes. Following the injecting step, the method further includes the step of shifting the injector to packing pressure mode so that molding material stops flowing into the cavity. For clamp-end coining, the inserts are secured in a fixed position within their respective sleeves, so that force exerted on the inserts by the molding material is transferred to the mold clamp.

The method involves closing the mold with a clamp force less than the force exerted on the insert during injection. During injection the mold is allowed to breathe thereby overcoming many of the obstacles associated with injection molding very thin lenses. As the injection pressure subsides, the mold begins to close to perform a coining operation, resulting in a strong, high yield carrier or lens.

For the lamination method, we provide injection molded PC coined lenses having a plano distance portion with a thickness between 0.8 mm to 0.3 mm. For example, ultra thin lenses 20 would have a distance portion with a thickness of between about 0.7 mm to about 0.3 mm. These lenses may be configured as any type of bifocal or multi-focal lens, for example, curved top, round seg, no-line or executive bifocals. The lamination method is well suited for use with straight top or flat top bifocal having an add power of about +1.00 to about +3.00 diopters.

Plastic lenses, and in particular polycarbonate (PC), may be subject to scratching. Typically the outward surface 20a of such PC lenses are provided with a hard coat solution. Such lenses may also include an antireflective (AR) coating, or both AR and hard coat. These coatings may be applied to front lens 20 at any time that does not interfere with the lamination process. In addition, when a straight top bifocal is utilized, the coating(s) must be applied in a manner that avoids pooling or other unacceptable conditions at the straight top ledge.

SV Support Lens

Semi Finished (SF) lenses are commonly produced with one optically finished side. This is represented by interior side 30c. SF lenses are manufactured in the first instance to be thicker than the final lens. The invention may use thermoplastic lenses, for example, polycarbonate. The exterior side 30d is ground at the lab into a predetermined shape that provides a varying thickness at points emanating radially from the lens center out to the lens periphery. When ground into this predetermined shape, the resulting lens is a Single Vision (SV) lens. The method according to the invention preserves this customization of SF lenses. This is referred to as the custom Rx for a particular customer. Within the context of the inventive method, the grinding process can occur at any time that does not interfere with the lamination.

The optically finished interior side 30c is coated with a photochromic solution that dries and solidifies to form a photochromic coating 30p. The application of the solution in a liquid form allows photochromic coating 30p to be applied without pressure and without an intermediate adhesive. As will be appreciated by those skilled in the art, this liquid application replaces several steps that are part of the prior art process. Those are the steps of: molding the photochromic layer into a shaped film; any trimming of the film; plasma/corona discharge treatment prior to adhering film; dispensing adhesive; and adhering the film onto one of the lenses.

Flexible Two-Stage Compound Application

Some SV lenses with photochromic layers 30p are designed to receive a protective coating. Accordingly, we consider the application of such protective coating as the first compound 50a to be applied in our applying step.

The protective layer 50a is suitable for adhering directly to the inward surface 20b of the ultra thin front lens 20. The adhesive layer 50b can be applied on top of first compound 50a or on inward surface 20b. For example, apply at least one drop of an optical adhesive on either 50a or 20b. The optical adhesive may be applied at room temperature with a syringe. Suitable adhesives are a UV curable adhesive, an acrylate based adhesive, and a UV curable acrylate based adhesive.

Alternatively, a film based adhesive can serve as second compound 50b. For example, a film based pressure sensitive adhesive (PSA) may be employed. One commercially available product is PSA tapes from Nitto Denko Europe.

Using a pressure-sensitive adhesive (PSA) is particularly advantageous since the layered structure (thin lens) is permanently retained on the lens (SFSV) in a simple and inexpensive manner, without impairing the optical properties of both the lens and the structure. In particular, no irradiation, such as ultraviolet irradiation, nor intensive heating is required for obtaining a permanent bonding with a pressure-sensitive adhesive. All pressure-sensitive adhesives exhibit permanent tack and have a low elastic modulus at room temperature, typically between $10^3$ and $10^7$ Pa (pascals). It is pointed out that the adhesion mechanism involved with pressure sensitive adhesives does not involve chemical bonding, but it is based on special viscoelastic properties of pressure-sensitive adhesives. These properties intrinsic to each pressure-sensitive adhesive formulation make it possible to create electrostatic van der Waals interactions at the bonding interface. This occurs when a pressure-sensitive adhesive is brought into contact with a solid material with pressure. The pressure and the low modulus of the pressure-sensitive adhesive create intimate contact of this latter at a molecular scale with the topology of the solid material. Moreover, bulk viscoelastic properties of the pressure-sensitive adhesive lead to dissipation, within the thickness of the adhesive layer, of the energy resulting from mechanical stressing of the bonding interface. Therefore the interface can withstand pull-strengths and debonding mechanisms.

In addition, pressure-sensitive adhesives can be deposited in the form of a thin layer with uniform thickness. Such thickness may be comprised between 0.5 and 300 μm. Then, image formation through the lens is not impaired by the layer of pressure-sensitive adhesive and the optical power of the lens is not altered.

Several pressure-sensitive adhesives may be used in a process according to the invention. Advantageously, the pressure-sensitive adhesive is selected from a compound based on a polyacrylate, a styrene-based block copolymer and a blend incorporating a natural rubber. Non-limiting examples of pressure-sensitive adhesives have general compositions based on polyacrylates, in particular polymethacrylates, or based on ethylene copolymers, such as ethylene vinyl acetate, ethylene ethyl acrylate and ethylene ethyl methacrylate copolymers, or on synthetic rubber and elastomers, including silicones, polyurethanes, styrene-butadienes, polybutadienes, polyisoprenes, polypropylenes, polyisobutylenes, or based on polymers containing nitriles or acrylonitriles, or on polychloroprene, or on block copolymers that include polystyrene, polyethylene, polypropylene, polyisoprene, polybutadiene, on polyvinylpyrrolidone or vinylpyrrolidone copolymers, or are blends (with continuous or discontinuous phases) of the above polymers, and also may comprise block copolymers obtained from the above-listed compounds. These pressure-sensitive adhesives may also include one or more additives selected from tackifiers, plasticizers, binders, antioxidants, stabilizers, pigments, dyes, dispersing agents and diffusing agents.

Some SV lenses simply have a photochromic layer 30p. The laboratory would have the option of applying a protective layer or a primer layer. In the case of the latter, we consider the primer layer as the first compound layer 50a. For example, a polyurethane latex primer may be used. The primer can be spin-coated on to photochromic layer 30p, at room temperature, and then dried at a temperature between 50 and 100 degrees C.

The second compound layer 50b would then be an adhesive. The adhesive layer 50b can be applied on top of first compound 50a or on inward surface 20b. For example, apply at least one drop of an optical adhesive on either 50a or 20b. The optical adhesive may be applied at room temperature with a syringe. Suitable adhesives are a UV curable adhesive, an acrylate based adhesive, and a UV curable acrylate based adhesive.

Alternatively, a film based adhesive can serve as second compound 50b. For example, a film based pressure sensitive adhesive (PSA) may be employed. One commercially available product is the PSA tapes from Nitto Denko Europe.

EXAMPLE 1

A 0.58 mm thick 6.50 base+2.00 add PC front lens was laminated to a 6.5 base semi-finished single vision (SFSV) Transitions® photochromic polycarbonate lens using a UV curable adhesive. The resulting SFSV bifocal lens laminate exhibited a very uniform darkening when exposed to sunlight.

EXAMPLE 2

A 0.58 mm thick 6.50 base+2.00 add PC front lens was laminated to a 6.5 base SFSV Transitions® photochromic polycarbonate lens using a PSA. The resulting SFSV bifocal lens laminate exhibited a uniform darkening when exposed to sunlight.

Lamination

After the intermediate layer 50a and second compound layer 50b have been prepared, the ultra thin front lens is ready for lamination. With SV lens 30 properly supported, front lens 20 is placed down with inward surface 20b facing the compound layers 50. Compressive pressure is applied to the outward surface 20a at room temperature. Suitable pressure is between 5 and 60 psi. For example, an inflatable bladder may apply between about 10 and about 25 psi. The bladder may be made from silicon, which is durable and avoids scratching the outward surface 20a. This compressive pressure is sufficient to press front lens 20 flat onto the stack, even if the interfacial surfaces 20b and coated surface 30a are of different base curves. Once front lens 20 is set, the assembly may be exposed to UV radiation to cure the adhesive, in the event that a UV curable adhesive has been employed.

The method according to the invention has numerous advantages and benefits over the prior art. The photochromic layer is easily solidified in situ without requiring the use of an intermediate adhesive. The photochromic layer is uniformly thick and near the front of the optical assembly. When a hard coat or AR coating is present on outward surface 20a, the photochromic layer 30p resides within about 0.7 to about 0.8 mm from the hard coat or AR coating.

In addition to the uniform darkening and preservation of the optical integrity of the original SV, there are several advantages of the present invention over other known approaches. Unlike in-mold decoration (IMD) or film insert molding (FIM) which requires mass production, the present lamination method can be performed on an individual bases, as needed, in the laboratory.

The method effectively utilizes our proprietary ultra thin coined lens in an optical assembly to deliver a straight top bifocal lens with photochromic functionality. The ultra thin lens can be flexed 0.5 diopters in base curve to conform to the base curve of surface 30c. This is particularly significant when providing a laminated lens series, that incorporates SV lenses having a range of base curves (on surface 30c). For example, consider a series that includes SV lenses with base curves from 6 to 8 diopters, in 0.25 diopter increments. That would result in 9 different SV lenses. One would only need a 6.5 base front lens and a 7.5 base front lens to create a lens assembly, where the 6.5 base front lens could be employed on the 6.00, the 6.25, the 6.50, the 6.75 and the 7.00 base SV lens. Accordingly, in a laminated lens series, one front lens, can accommodate a full 1.00 diopter range of support lenses.

Having described preferred embodiments for laminating lens assemblies, materials used therein and coatings for same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for producing laminated photochromic lenses by forming a sandwich consisting of a photochromic layer, a primer layer and an adhesive layer between a support lens and a front lens comprising:

providing an injection molding machine with inserts secured within their respective sleeves so that force exerted on the inserts by a molding material is transferred to a mold clamp;

injecting thermoplastic molding material in one shot to force a mold open and coining an ultra thin front lens with an integral bifocal region as the mold begins to close, wherein the ultra thin front lens has a substantially uniform thickness of less than 0.8 mm outside the bifocal region;

solidifying a liquid photochromic solution in situ onto a single vision (SV) support lens without pressure to form a photochromic layer directly on a SV support lens surface in the absence of an intermediate layer;

coating a primer layer directly onto the photochromic layer;

applying an adhesive layer to be directly in contact with the primer layer and the ultra thin front lens; and laminating said ultra thin front lens onto said primer layer with adhesive and compressive pressure, whereby the shape of the ultra thin front lens can be deflected up to 0.5 base curves to completely conform to the shape of the SV support lens surface.

2. The method of claim 1, wherein said injection molding step comprises injection molding an ultra thin lens from polycarbonate having a viscosity of less than 400 Pa for shear rates below 1,000/s.

3. The method of claim 2, wherein said injection molding step comprises coining an ultra thin lens having a thickness between 0.8 mm and 0.3 mm.

4. The method of claim 2, wherein said injection molding step comprises injection molding an ultra thin lens having a thickness between 0.7 mm and 0.5 mm.

5. The method of claim 3, wherein the ultra thin front lens comprises a straight top bifocal lens having an add power between +1.00 and +3.00 diopters.

6. The method of claim 1, wherein the primer layer includes a polyurethane latex primer.

7. The method of claim 6, wherein the primer is spin-coated onto a convex surface of the lens at room temperature then dried at a temperature between 50 degrees and 100 degrees C. to form the primer layer.

8. The method of claim 6, wherein said adhesive layer includes an optical adhesive.

9. The method of claim 8, wherein said applying step comprises applying at least one drop of UV curable optical adhesive.

10. The method of claim 9, wherein said UV curable optical adhesive comprises an acrylate.

11. The method of claim 6, wherein said applying step comprises applying a pressure sensitive adhesive film.

12. The method of claim 1, wherein said laminating step occurs at room temperature with a pressure between 5 psi and 60 psi.

13. The method of claim 1, wherein said laminating step occurs at room temperature with a pressure between about 10 psi and about 25 psi.

14. The method of claim 12, wherein said laminating step comprises inflating a silicon rubber bladder to apply pressure onto the ultra thin front lens.

15. The method of claim 1, wherein the ultra thin lens comprises a straight top bi-focal lens having an add power of between +1.00 and +3.00 diopters.

16. The method of claim 15, wherein the straight top bi-focal lens includes a front surface that is coated with one of a hard coat and an antireflective coating.

17. The method of claim 16, wherein the SV support lens has a back surface that is adapted to be ground so that the SV support lens prescription can be customized, thereby providing a straight top bi-focal lens with photochromic properties contributed by a uniformly thick, internally laminated photochromically active layer.

* * * * *